United States Patent
Isoda et al.

(10) Patent No.: US 6,832,598 B2
(45) Date of Patent: Dec. 21, 2004

(54) ANTI-KNOCKING DEVICE AN METHOD

(75) Inventors: Naoya Isoda, Mori-machi (JP); Yoshiyuki Nagatsu, Mori-machi (JP)

(73) Assignee: Kabushiki Kaisha Moric, Mori-machi (JP)

( * ) Notice: Subject to any disclaimer, the term of this patent is extended or adjusted under 35 U.S.C. 154(b) by 0 days.

(21) Appl. No.: 10/249,985

(22) Filed: May 23, 2003

(65) Prior Publication Data

US 2003/0168046 A1 Sep. 11, 2003

Related U.S. Application Data

(63) Continuation-in-part of application No. 09/682,457, filed on Sep. 5, 2001, now Pat. No. 6,626,145.

(30) Foreign Application Priority Data

Oct. 12, 2000 (JP) .................................. 2000-311790
May 30, 2002 (JP) .................................. 2002-156533

(51) Int. Cl.⁷ .................................................. F02P 5/15
(52) U.S. Cl. ........................ 123/406.24; 123/406.29
(58) Field of Search .................. 123/406.23, 406.24, 123/406.29, 435, 436, 612, 617, FOR 109, FOR 114; 701/110, 111

(56) References Cited

U.S. PATENT DOCUMENTS

| | | |
|---|---|---|
| 3,870,869 A | 3/1975 | Eberle et al. |
| 3,969,614 A | 7/1976 | Moyer et al. |
| 4,197,767 A | 4/1980 | Leung |
| 4,276,600 A | 6/1981 | Hartford et al. |
| 4,291,383 A | 9/1981 | Tedeschi et al. |
| 4,301,678 A | 11/1981 | Full et al. |
| 4,309,759 A | 1/1982 | Tokuda et al. |
| 4,309,971 A | 1/1982 | Chiesa et al. |
| 4,344,140 A * | 8/1982 | Leung ........................ 701/111 |
| 4,380,800 A | 4/1983 | Wilkinson |
| 4,403,584 A | 9/1983 | Suzuki et al. |
| 4,433,381 A | 2/1984 | Wilkinson |
| 4,483,184 A | 11/1984 | Kunzfeld |
| 4,527,523 A | 7/1985 | Daumer et al. |
| 4,532,592 A | 7/1985 | Citron et al. |
| 4,590,563 A | 5/1986 | Matsumura et al. |
| 4,697,561 A | 10/1987 | Citron |
| 4,725,955 A | 2/1988 | Kobayashi et al. |
| 4,814,997 A | 3/1989 | Matsumura et al. |
| 4,829,440 A | 5/1989 | Abe |
| 4,840,245 A | 6/1989 | Kamei et al. |
| 4,852,537 A | 8/1989 | Nagano et al. |
| 4,870,586 A | 9/1989 | Asakura et al. |
| 4,879,656 A | 11/1989 | Quigley et al. |
| 4,884,547 A | 12/1989 | Tamura |
| 4,887,216 A | 12/1989 | Ohnari et al. |
| 4,893,600 A | 1/1990 | Holmes |
| 4,911,128 A | 3/1990 | Hara et al. |

(List continued on next page.)

FOREIGN PATENT DOCUMENTS

| | | |
|---|---|---|
| GB | 2196153 | 4/1988 |
| GB | 2237388 | 5/1991 |
| GB | 5313200 | 11/1997 |
| JP | 64-24164 | * 1/1989 |

Primary Examiner—Willis R. Wolfe
(74) Attorney, Agent, or Firm—Ernest A Beutler

(57) ABSTRACT

A method and apparatus that permit anti-knock control without the use of separate knock detectors as well as controlling the basic ignition timing from the output of a single engine speed sensor.

10 Claims, 4 Drawing Sheets

U.S. PATENT DOCUMENTS

| | | |
|---|---|---|
| 4,924,831 A | 5/1990 | Piteo et al. |
| 4,928,652 A | 5/1990 | Shinya et al. |
| 4,951,206 A | 8/1990 | Kyohzuka |
| 4,991,102 A | 2/1991 | Sakamoto et al. |
| 4,993,387 A * | 2/1991 | Sakakibara et al. ......... 123/435 |
| 5,021,956 A | 6/1991 | Yoshimura et al. |
| 5,021,959 A | 6/1991 | Jundt et al. |
| 5,086,741 A | 2/1992 | Nakamura et al. |
| 5,099,429 A | 3/1992 | Onari et al. |
| 5,121,324 A | 6/1992 | Rini et al. |
| 5,184,589 A | 2/1993 | Nonaka |
| 5,191,531 A | 3/1993 | Kurosu et al. |
| 5,218,945 A | 6/1993 | Kapellen et al. |
| 5,249,130 A | 9/1993 | Mamiya et al. |
| 5,278,762 A | 1/1994 | Kawamura |
| 5,284,116 A | 2/1994 | Richeson, Jr. |
| 5,341,299 A | 8/1994 | Stellwagon et al. |
| 5,345,817 A | 9/1994 | Grenn et al. |
| 5,392,753 A | 2/1995 | Burson et al. |
| 5,445,014 A | 8/1995 | Fiorenza, II et al. |
| 5,485,382 A | 1/1996 | Seki et al. |
| 5,548,514 A | 8/1996 | Hasegawa et al. |
| 5,566,071 A | 10/1996 | Akazaki et al. |
| 5,575,268 A | 11/1996 | Hirano et al. |
| 5,577,475 A | 11/1996 | Backer et al. |
| 5,629,853 A | 5/1997 | Ogawa et al. |
| 5,672,817 A | 9/1997 | Sagisaka et al. |
| 5,681,239 A | 10/1997 | Toukura |
| 5,684,248 A | 11/1997 | Iwata |
| 5,988,140 A | 11/1999 | Gartner et al. |
| 6,023,651 A | 2/2000 | Nakamura et al. |
| 6,234,145 B1 | 5/2001 | Shomura |
| 6,272,425 B1 | 8/2001 | Herndon |
| 6,343,586 B1 | 2/2002 | Muto et al. |
| 6,626,145 B2 * | 9/2003 | Enoyoshi et al. ...... 123/406.24 |

* cited by examiner

ANTI-KNOCKING DEVICE AN METHOD

CROSS REFERENCE TO RELATED APPLICATIONS

This application is a continuation in part of the co-pending application entitled, "ENGINE CONTROL METHOD AND APPARTUS" Ser. No. 09/682457, filed, Sep. 5, 2001, now U.S. Pat. No. 6,626,145, in our names and that of another inventor; which application is assigned to the assignee hereof.

BACKGROUND OF INVENTION

The aforenoted co-pending application disclosed a very simple but highly effective way of determining engine load and controlling an engine control system in response to the determined load to improve engine operation. That method and apparatus, because of its simplicity, permits incorporation in relatively small and low production volume engines as used in motorcycles, motor scooters and like engine applications. Generally that earlier application relates specifically to engine spark timing control.

Many engines utilizing a wide variety of spark control arrangements frequently incorporate, in addition to the basic spark timing control, an additional control for preventing or reducing an undesirable engine operating condition, known as "knocking". These controls generally incorporate a "knock sensor" which senses the presence of that condition. The spark timing is then altered to suppress the knocking.

Obviously the added sensor and associated control adds significantly to the cost. This added structure also makes it prohibitive to incorporate such knock control in small and low production volume engines, in spite of the added benefit.

It is, therefore, a principle object of this invention to provide a simplified, low cost knock control system and method that does not require a separate knock detector.

SUMMARY OF INVENTION

A first feature of this invention is adapted to be embodied an internal combustion engine and control system therefore. The engine comprises a driven shaft, a sensor arrangement associated with said driven shaft for sensing the rotational speed of the driven shaft during the rotation of the driven shaft. An ignition system is provided for firing the engine. The engine speed sensor is employed to determine a change in the load on the engine. If the engine load change is greater than a predetermined amount indicative of an incipient knocking condition, the ignition timing control is altered to retard the timing.

In accordance with a further feature of the invention, the engine load is determined by the change in engine speed during successive intervals.

Another feature of the invention is adapted to be embodied in a method for controlling or suppressing the knocking of an internal combustion engine. In accordance with this feature of the invention, variations in the speed of rotation of an engine shaft are measured to determine changes in engine load. If the engine load exceeds a predetermined value, it is assumed that an incipient knocking condition exists and ignition timing is retarded.

DETAILED DESCRIPTION

Before describing the invention in detail by reference to the figures hereof, the disclosure of the aforenoted application is hereby incorporated by reference as it shows more details of the basic type of engine with which the invention may be utilized and also the basic spark control apparatus and method. However it is also believed that from the following description those skilled in the are will readily understand how to practice the invention, not only with the basic structure and methodology as shown in that application, but also with a wide variety of engine ignition controls where knock control would be a valuable addition.

Figure 1:
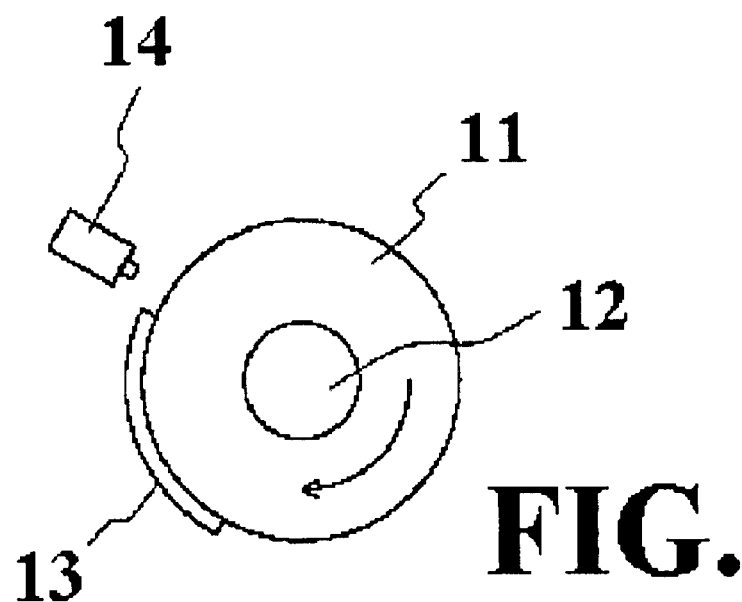
FIG. 1 is a view showing an engine shaft speed sensor employed with the engine control structure and method of the invention.

Referring now in detail to the drawings and initially to FIG. 1, an engine speed sensor is depicted as associated, for example, with an engine driven shaft element of an associated internal combustion engine of any desired type. Specifically a flywheel 11 is affixed for rotation with an engine shaft and specifically in this embodiment a crankshaft 12. The crankshaft 12 is journalled for rotation within a body of the engine, as is well known in this art. The flywheel 11 carries a timing mark 13, which as noted in the aforenoted co-pending application has a greater circumferential extent than those normally used in the art. In a preferred embodiment the circumferential length of the mark 13 is about 60Â° of crankshaft rotation and the leading edge of the mark 13 is a few degrees before top dead center (tdc).

Figure 2:
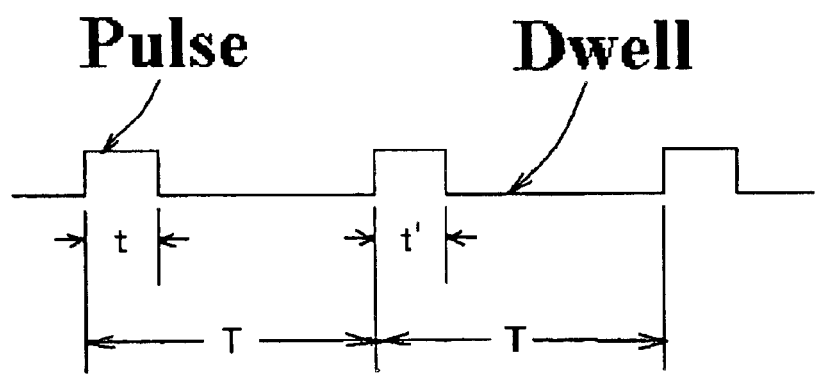
FIG. 2 is a graphical view showing the output of the sensor shown in FIG. 1.

A sensor coil 14 cooperates with the timing mark 13 and generates positive and negative pulses as the leading and trailing edges of the timing mark 13 pass the sensor. These pulses are roughly approximated as shown in FIG. 2. The remaining portion of the rotation causes no output as also shown in FIG. 2. A conventional ignition timing sensor may be used for the sensor coil 14.

In the illustrated embodiment, there is one timing mark. However, it may be advantageous, particularly for anti-knock control to use several, circumferentially spaced timing marks at various positions related to the piston stroke.

The time interval T between two leading edge pulse signals is the time for the shaft 12 to complete one revolution and hence the instantaneous shaft speed for this revolution is the inverse function of that time interval. On the other hand, the time interval t for the timing mark 13 to pass the sensor coil 14 is the instantaneous time for the shaft 12 to complete a partial revolution immediately before tdc.

As noted in the aforenoted co-pending application, the ratio t/T calculated as a degree of rotational variation "D" is directly related to engine load. Thus the engine load is determined using a map stored in a memory of a microcomputer. As for the map, the correlation between the degree of rotational variation, the rotational speed of the crankshaft and the engine load is determined by a preliminary experiment or the like, and the three-dimensional map obtained is stored in the memory. Thus the basic ignition timing for the engine can be set using this data.

It has now been discovered that this same information can be utilized to detect knocking or incipient knocking. Thus when that condition arises, it is possible to prevent it by retarding the spark. Not only does this prevent knocking, but it also permits the use of optimum spark advance for all running conditions thus improving engine efficiency.

Therefore, in accordance with this invention, the presence of knocking is detected from the engine load and the degree of rotational variation. When no knocking is present, the ignition timing is advanced by a predetermined amount from the basic ignition timing for the normal operation. The determining criterion value of the presence of knocking is determined, according to the engine in advance by experiments.

As the knocking judgment criterion, the change of the degree of rotational variation may also be used. That is, as described above, after calculating the degree of rotational variation D=t/T, the detection time t" and the period T" for the succeeding revolution are measured and their ratio t"/T" is calculated. The difference between the two degrees of rotational variation is calculated as the change D" of rotational variation. The occurrence of knocking can be determined from D and/or D".

The principle is applicable to both two-stroke and four-stroke engines. With a two-stroke engine, the difference is calculated between one and succeeding revolutions of the crankshaft. In a four-stroke engine, the difference in the degree of rotational variation may be determined between compression and exhaust strokes in one cycle (two revolutions) or between two compression strokes or between two exhaust strokes of continuous cycles.

Figure 3:
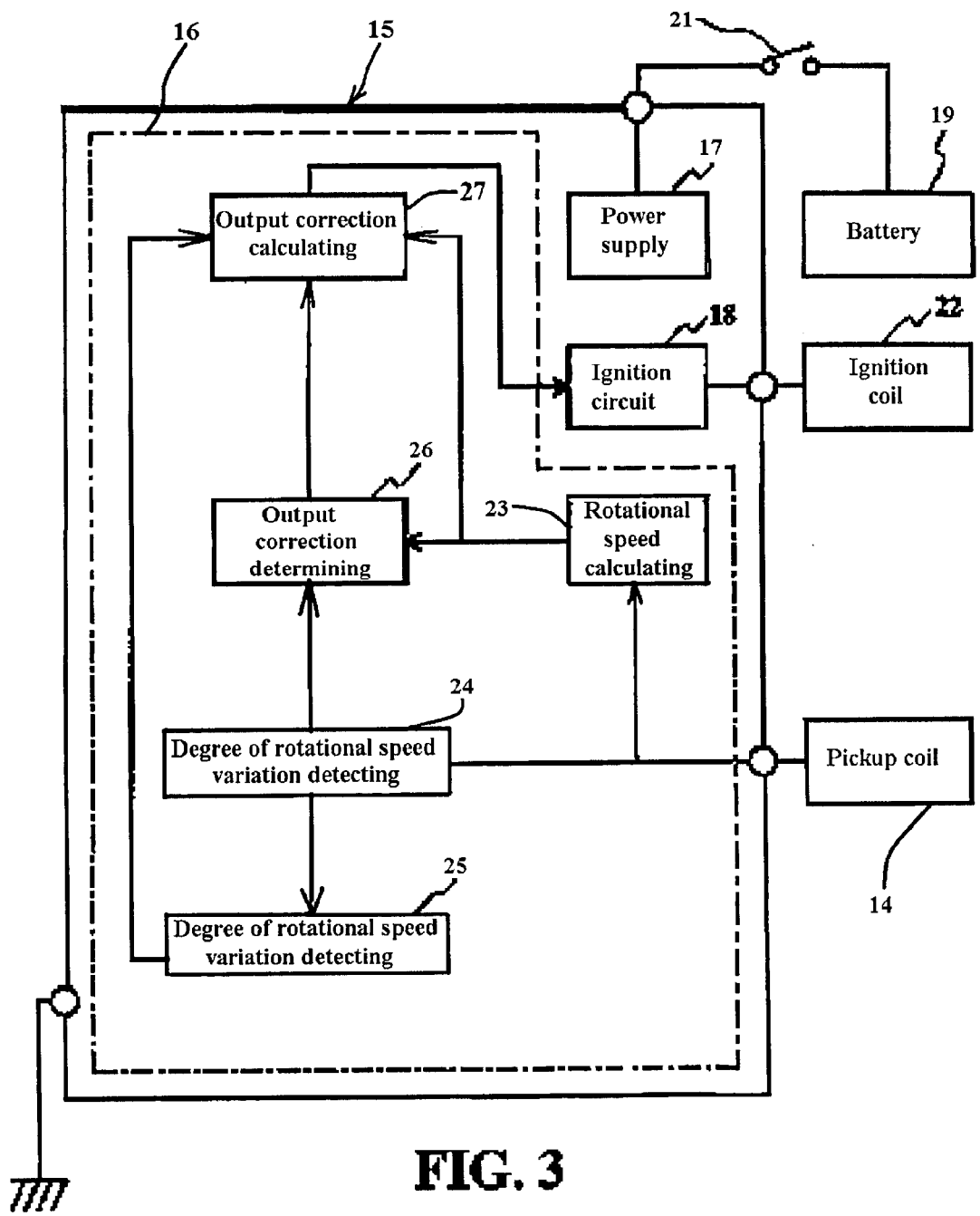
FIG. 3 is a block diagram showing one form of anti-knocking device and method according to an embodiment of the invention.

The apparatus for performing this function will now be described by reference to FIG. 3. As shown schematically in this figure, an ignition control system, indicated generally by the reference numeral 15, includes a with a calculation circuit 16, a power supply circuit 17, and an ignition circuit 18. The power supply circuit 17 is powered by a battery 19 through a main switch 21. The ignition circuit 18 outputs a signal to an ignition coil 22 for firing a spark plug (not shown).

The calculation circuit 16 receives the output from the sensor coil 14 (FIG. 1). The calculation circuit 16 is made up of a revolution detecting section 23, a degree-of-rotational variation detecting section 24, a degree-of-rotational variation width detecting section 25, an output correcting determination section 26, and an ignition timing determining section 27.

The revolution speed detecting section 23 calculates the revolution from the detection signal coming from the pickup coil 14 as previously described before. The degree of rotational variation detecting section 24 calculates the degree of rotational variation D from the detection signal coming from the pickup coil 14 as also previously described.

The degree of rotational variation width detecting section 25 calculates the variation width of plural data of the degree of rotational variation. The load amount calculating section 15 calculates a current engine load from the degree of rotational variation as described above.

The ignition timing determining section 27 calculates basic ignition timing for the normal operation based upon the rotational speed and engine load. The ignition timing determining section 27 further determines in addition to the basic ignition timing, the occurrence of knocking. This condition is based on the rotational speed, engine load, degree of rotational variation and/or its change, and width of the degree of rotational variation. If knocking is found to be present, the section 27 retards the ignition timing to a value at which no knocking occurs. If knocking is not determined, the ignition timing is advanced to a specified amount to increase output.

Figure 4:
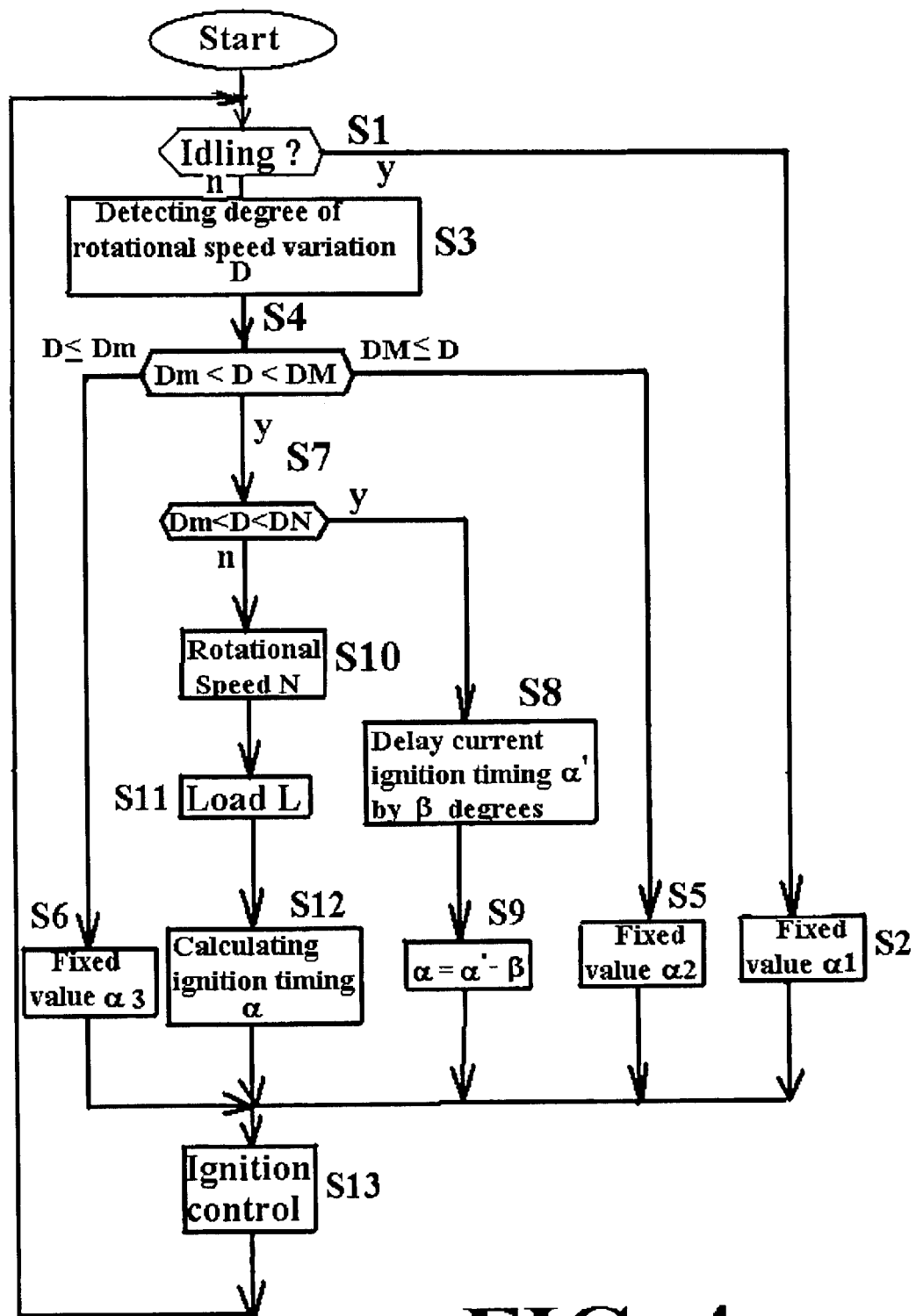
FIG. 4 is a block diagram, in part similar to FIG. 3, showing another embodiment of the invention.

One control routine by which this is accomplished will now be described by reference to FIG. 4. In this embodiment, knocking state is determined from the value of degree of rotational variation. After the program starts it moves to the step S1 where it is determined whether or not the engine is in the idling state. The determination is made for example from the rotational speed detected by the rotating speed detecting section 23. If the engine is in the idling state, the ignition timing is set to a predetermined fixed value of $Î±1$ at the step S2.

If, however at the step S1 it is determined that the engine is not idling, the degree of rotational variation D is calculated by the degree-of-rotational variation detecting section 24 as previously described, at the step S3. Then the program moves to the step S4 to determine whether or not the calculated degree of rotational variation D is within a specified range from Dm to DM. This is done for checking anomaly of the degree of rotational variation.

If the degree of rotational variation D is not smaller than DM, the ignition timing is set to a predetermined fixed value of $Î±2$ at the step DS5. If however the degree of rotational variation D is not greater than Dm, the ignition timing is set to a predetermined fixed value of $Î±3$ at the step S6.

If the value of the degree of rotational variation D is within a specified range from Dm to DM then the value of D is compared to a new range of Dn to DN at the step S7. This is for determining the presence of knocking. If at this step S7 it is determined that the engine is in knocking state because the degree of rotational variation D is within the range from Dn to DN, and an angle $Î^2$ is set by which the current ignition timing $Î±$ is to be delayed is set at the step S8. Then at the step S9 an ignition timing $Î±=Î±'-Î^2$ is calculated by subtracting $Î^2$ from the current ignition timing $Î±'$.

However if the degree of rotational variation D is outside the knocking range (Dn to DN), at the step S7 it is determined that the engine is not in knocking state, and the revolution detecting section 23 calculates a rotational speed N at the step S10. The load amount calculating section 15 then calculates the engine load L based on the degree of rotational variation D as described previously at the step S11.

The ignition timing determining section 27 then calculates an ignition timing $Î±$ which is advanced from the basic ignition timing based on the engine load L as described before at the step S12.

Thus when the respective ignition timing of $Î±, Î±1, Î±2$, or $Î±3$ is calculated at the respective of the steps S9, S2, S5 or S6, the ignition coil 22 is activated through the ignition circuit 18 at the calculated ignition timing at the step S13.

Figure 5:
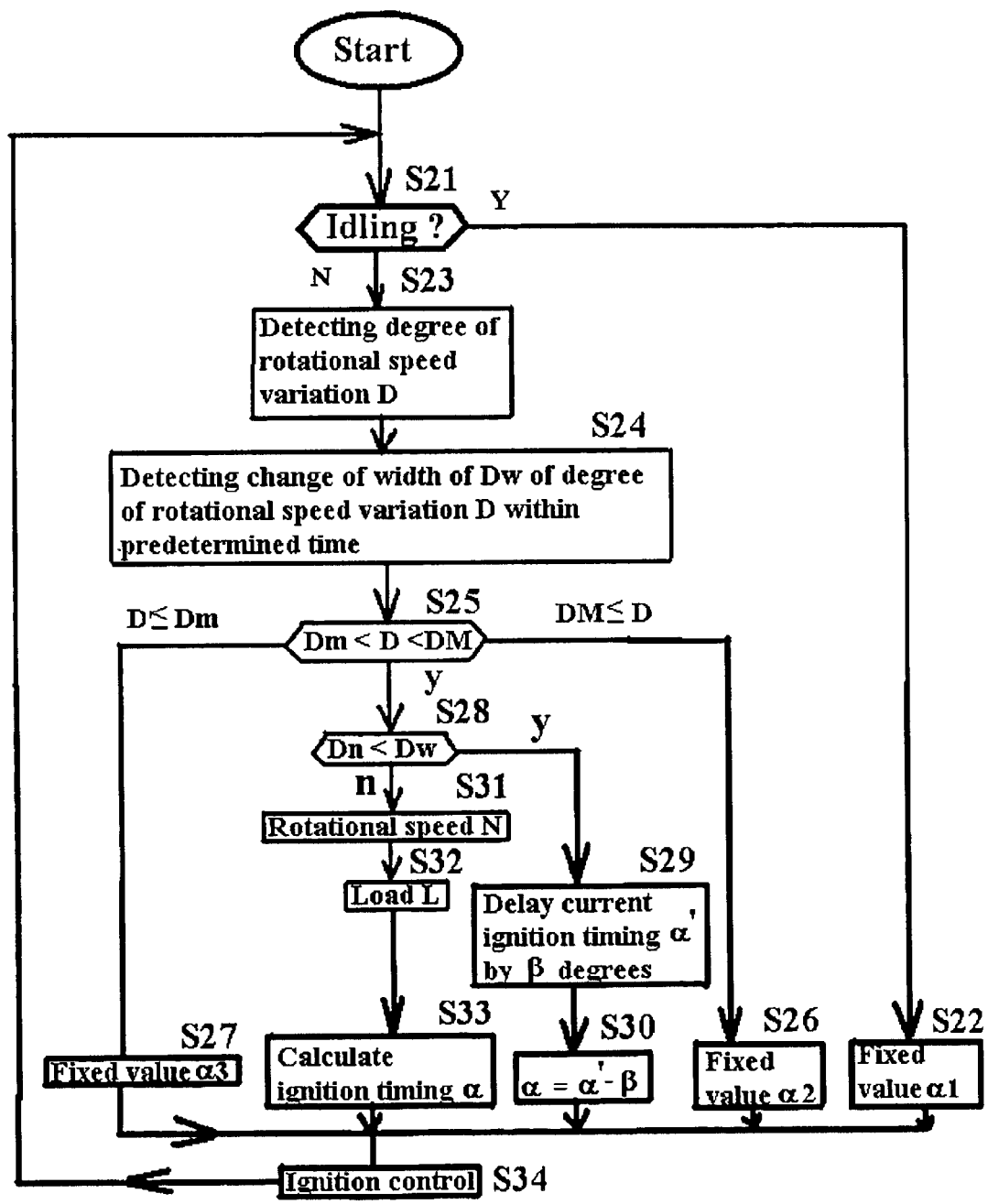

Referring now to FIG. 5, this is a flowchart of another embodiment of the invention. This embodiment determines knocking state based on the width of the degree of rotational variation. Again the program begins at the step s21 to determine if the engine is in an idling state. As noted before, this determination is made for example according to the rotational speed calculated by the revolution detecting section 23. When the idling state is present, the ignition timing is set to a predetermined fixed value of $Î±1$ at the step S22.

If it is determined at the step S21 that the engine is not idling, the degree-of-rotational variation detecting section 24 calculates the degree of rotational variation D as described before at the step S23. Then the degree-of-rotational variation width detecting section 14 calculates the width Dw of the degree of rotational variation over a predetermined period of time at the step S24.

The program then moves to the step S25 where it is determined if the degree of rotational variation D calculated at step S24 is in the range of Dm to DM is determined. This is intended for checking anomaly in the degree of rotational variation. If at the step S2 the degree of rotational variation D is not smaller than DM, the ignition timing is set to a predetermined fixed value of $Î±2$ at the step S26.

If at the step S25 it is determined that the degree of rotational variation D is not greater than Dm, the ignition timing is set to a predetermined fixed value of $Î±3$ at the step S27.

If at the step S25 it is determined that the value of D is in the range of Dm to DM, the program moves to the step S28 to determine whether or not the width Dw of the degree of rotational variation calculated in step S25 is greater than the knocking determining reference value Dn. If Dw is greater than Dn, it is determined that a knocking state is present at the step S29 an angle Î² by which the current ignition timing Î±" is to be delayed is set. Then at the step S30, the angle Î2 is subtracted from the current ignition timing Î±' to obtain the delayed ignition timing Î±=Î±'−Î².

However if at the step S28 it has been determined that the width Dw of the degree of rotational variation is not greater than the knocking determining reference value Dn, it is determined that the engine is not in a knocking state, and the revolution detecting section 23 calculates the rotational speed N at the step S31. Then at the step S32 the load amount calculating section 15 calculates the engine load L according to the degree of rotational variation D as described before. The ignition timing determining section 16 then calculates an ignition timing Î± which is advanced from the basic ignition timing based on the engine load L as described above at the step S33.

The ignition coil 11 is activated through the ignition circuit 18 at the calculated ignition timing of Î±, Î±1, Î±2, or Î±3 at the step S34 in the manner as described in connection with the embodiment of FIG. 4.

Thus it should be apparent to those skilled in the art that the described methods and apparatus permit anti-knock control without the use of separate knock detectors and in fact with a very simple, low cost and highly effective ignition control. Of course those skilled in the art will readily understand that the foregoing represents only preferred embodiments of the invention and that various changes and modifications may be made without departing from the spirit and scope of the invention, as defined by the appended claims.

What is claimed is:

1. An internal combustion engine and control system therefore, said engine comprising a driven shaft, a sensor arrangement associated with said driven shaft for sensing the rotational speed of the driven shaft during the rotation of the driven shaft, an ignition system for firing said engine, said engine speed sensor determining a change in the load on said engine and if said engine load change is greater than a predetermined amount indicative of an incipient knocking condition said ignition timing control is altered to retard the timing and preclude knocking.

2. An internal combustion engine and control system therefore as set forth in claim 1, wherein the engine load is also utilized to set the basic ignition timing in addition to the retardation to avoid knocking.

3. An internal combustion engine and control system therefore as set forth in claim 1, wherein said engine speed sensor senses the instantaneous rotational speed of the driven shaft during the rotation of said driven shaft for less than a complete rotation and senses the rotational speed of said driven shaft for a complete revolution thereof including the measured less than complete rotation, and determines the engine load from these measurements.

4. An internal combustion engine and control system therefore as set forth in claim 3, wherein the engine load is determined by the change in engine speed during successive intervals.

5. An internal combustion engine and ignition control system therefore, said engine comprising a driven shaft, a sensor arrangement associated with said driven shaft for sensing the rotational speed of the driven shaft during the rotation of the driven shaft, an ignition system for firing said engine, said engine speed sensor determining the load on said engine for providing a signal to said ignition system for determining the timing of firing said ignition system in response to engine load, said engine speed sensor further providing a signal if the engine load change is greater than a predetermined amount indicative of an incipient knocking condition for altering said ignition timing control to retard the timing and preclude knocking.

6. A method of controlling an internal combustion comprising a driven shaft, a sensor arrangement associated with the driven shaft for sensing the rotational speed of the driven shaft during the rotation of the driven shaft, and an ignition system for firing the engine, said method comprising determining a change in the load on said engine from the output of the engine speed sensor and if said engine load change is greater than a predetermined amount indicative of an incipient knocking condition retard the ignition timing and preclude knocking.

7. A method of operating an internal combustion engine as set forth in claim 6, wherein said engine speed sensor senses the instantaneous rotational speed of the driven shaft during the rotation of said driven shaft for less than a complete rotation and senses the rotational speed of said driven shaft for a complete revolution thereof including the measured less than complete rotation, and the engine load is determined from these measurements.

8. A method of operating an internal combustion engine as set forth in claim 7, wherein the engine load is determined by the change in engine speed during successive intervals.

9. A method of operating an internal combustion engine as set forth in claim 6, wherein the engine load is also utilized to set the basic ignition timing in addition to the retardation to avoid knocking.

10. A method of operating an internal combustion engine comprising a driven shaft, a sensor arrangement associated with said driven shaft for sensing the rotational speed of the driven shaft during the rotation of the driven shaft, an ignition system for firing said engine, said method comprising the steps of utilizing the engine speed sensor for determining the load on the engine for providing a signal to the ignition system for determining the timing of firing the ignition system in response to engine load, and also employing the engine speed sensor to providing a signal if the engine load change is greater than a predetermined amount indicative of an incipient knocking condition for altering said ignition timing control to retard the timing and preclude knocking.

* * * * *